United States Patent [19]

Hinley et al.

[11] 3,825,388
[45] July 23, 1974

[54] APPARATUS FOR THE TREATMENT OF PIGMENTS

[75] Inventors: John James Hinley, Middlesbrough; John Gibson, Stockton-on-Tees, both of England

[73] Assignee: British Titan Limited, Billingham, Teesside, England

[22] Filed: Mar. 30, 1972

[21] Appl. No.: 239,521

[30] Foreign Application Priority Data
Apr. 7, 1971  Great Britain ..................... 9034/71

[52] U.S. Cl. .................... 425/222, 23/286, 264/117
[51] Int. Cl. .............................................. B29b 1/03
[58] Field of Search .......... 23/286, 259.7, 313, 314; 264/6, 8, 117; 425/6, 222, 310

[56] References Cited
UNITED STATES PATENTS

| | | | |
|---|---|---|---|
| 2,553,714 | 5/1951 | Lucas | 425/222 X |
| 2,579,886 | 12/1951 | Vettel | 264/117 |
| 2,674,522 | 4/1954 | Takewell et al. | 425/222 |
| 2,709,833 | 6/1955 | Wiklund | 425/222 |
| 2,828,190 | 3/1958 | King | 264/117 X |
| 2,834,044 | 5/1958 | Antonsen et al. | 425/222 |
| 2,987,381 | 6/1961 | Carter et al. | 23/286 X |
| 3,353,208 | 11/1967 | Fergus | 425/222 |

*Primary Examiner*—Robert L. Spicer, Jr.
*Attorney, Agent, or Firm*—Schuyler, Birch, Swindler, McKie & Beckett

[57] ABSTRACT

Apparatus for the pelletisation of inorganic pigment in which a vessel having a circular inner surface is rotatably mounted and has at one end an inlet for the pigment to be pelletised and at the other end an outlet for the pellets with at least a portion of the circular inner surface adjacent the outlet end at an angle to the axis of the vessel which is less than the angle of slip of pellets of the pigment on the material of construction of the inner surface.

16 Claims, 2 Drawing Figures

APPARATUS FOR THE TREATMENT OF PIGMENTS

This invention relates to apparatus for the pelletisation of inorganic pigments and to a method of pelletisation using such apparatus.

According to the invention apparatus for the pelletisation of inorganic pigment comprises a rotatably mounted vessel having in cross-section a circular inner surface and at one end an inlet for the pigment to be pelletised and at the other end an outlet for pellets and with at least the portion of the circular inner surface wall adjacent the outlet being at an angle to the axis of the vessel which is less than the angle of slip of pellets of the pigment on the material of construction of the inner surface.

According to the present invention also apparatus for the pelletisation of inorganic pigment comprising a rotatably mounted cylindrical drum having at one end an inlet for pigment to be pelletised and at the other end a centrally positioned outlet for pelletised pigment and the drum having a first portion of a substantially constant internal diameter along its length and an outlet portion of progressively uniformly decreasing internal diameter from the first portion to the outlet with the inner wall of the outlet portion forming an angle with a projection of the inner wall of the first portion which is less than the angle of slip of pellets of the pigment on the material of construction forming the outlet portion.

The present invention also relates to a method of pelletisation of an inorganic pigment, particularly titanium dioxide pigment, in which the pigment to be pelletised is fed through the inlet of the apparatus described in the two immediately preceding paragraphs converting the pigment into pellets by rotating the vessel or the cylindrical drum about its longitudinal axis and thereby discharging the pellets from the vessel or the drum through the outlet.

The apparatus of the present invention when used for the pelletisation of inorganic pigments, particularly titanium dioxide pigments, produces pellets which are substantially free from hard undispersible grits. It has been found that during pelletisation using a vessel or a cylindrical drum of the type referred to herein in which the wall of the outlet portion forms an angle with the projection of the wall of the first portion greater than the angle of slip then it is probable that some of the pigment is retained in the drum for extended periods of time which causes the formation of hard undispersible grits. These are objectionable when present in a paint or other compositions.

The apparatus of the present invention preferably comprises a cylindrical drum or vessel which is mounted to be rotatable about its longitudinal axis. The drum, for instance, can be mounted on at least a pair of rollers mounted parallel to its longitudinal axis which are driven in an appropriate direction to impart a rotating motion to the drum and produce the necessary tumbling action within the drum of the pigment to be pelletised. Alternatively the drum or vessel can be provided with bearings and a sprocket driven by any suitably mounted gear mechanism.

The cylindrical drum or vessel will normally have a smooth interior wall of substantially uniform internal diameter along its cylindrical length. One end of the drum or vessel is provided with an inlet for the pigment to be pelletised. The other end of the drum or vessel is shaped to provide the outlet portion and an outlet for the pellets.

The outlet portion has a wall of uniformly decreasing internal diameter from the diameter of the first portion and accordingly internally is cone shaped with its apex open to provide the outlet for the pellets. The outlet can be a suitably sized hole but if desired the wall can have an outwardly directed flange or lip to assist discharging of the pellets into a suitable container or on to other suitable collection means such as a moving belt. If desired the pellets can be discharged directly from the cylindrical drum or vessel into a hopper connected to apparatus for filing boxes or sacks or other packages.

The cylindrical drum or vessel of the present invention can be formed from any suitable material but usually will be formed from a metal such as stainless steel.

As stated previously it has been found that the wall of the outlet portion should form an angle with a projection of the wall of the first portion which is less than the angle of slip of pellets on the material of construction forming the wall of the outlet portion. For instance when titanium dioxide having a coating of 5 percent alumina and 10 percent silica is to be pelletised and the outlet portion is formed from stainless steel, the angle should be less than 12°. The angle of slip for any pigment on any material of construction can be measured easily by placing pellets of the material on a horizontal sheet or plate of the particular chosen material of construction. One end of the plate can then be slowly raised while the angle of the plate to the horizontal surface is noted and the angle where the pellets begin to slip from the surface is the angle of slip. It has been found that in the pelletisation of titanium dioxide pigment using a stainless steel drum the angle can advantageously be of the order of 10°, although smaller angles can be used if desired. Usually the angle will not be less than 5°. Preformed pellets required for carrying out this test can be obtained by trundling the pigment in a drum.

An alternative definition of the angle of the outlet portion is that the angle formed between the outlet portion and the axis of the drum is less than the angle of slip of the material pelletised.

If desired the vessel can be of progressively decreasing inner diameter from the inlet end to the outlet end, with that part of the wall adjacent the outlet being at an angle with the axis of the drum which is less than the angle of slip of pellets of the pigment on the material of construction of the wall.

The apparatus of the present invention is particularly useful when used in a continuous process in which the pigment to be pelletised is continuously fed into the drum or vessel and pelletised pigment is continuously discharged from the outlet of the drum or vessel. If desired, however, the apparatus can be used in a batchwise process. Any method of feeding the pigment to be pelletised into the interior of the drum or vessel can be used providing it does not cause excessive compaction of the pigment but one very useful method of feeding is to employ a vibratory feeder. Pigment can be fed to the vibratory feeder from a suitably located hopper.

It is preferred, when titanium dioxide is to be pelletised using the apparatus of the present invention, that the particles of titanium dioxide to be pelletised have a coating of one or more hydrous oxides in a total amount of at least 3.5 per cent by weight of $TiO_2$. Preferably the particles of titanium dioxide have a coating of one or more hydrous oxides in a total amount of at least 5 per cent by weight of $TiO_2$ and when the pigment is to be used in an aqueous emulsion paint it is preferable that the total amount of hydrous oxide present is at least 12 per cent by weight of $TiO_2$. Typical hydrous oxides that can be present as coatings on the titanium dioxide are those of aluminium, titanium, cerium, zirconium or silicon. Particularly useful pigments to be pelletised are those of titanium dioxide coated with hydrous oxides of silicon and aluminium in a mole ratio of 1:2 to 3:1. For use in emulsion paints, pellets are preferred in which the coating on the titanium dioxide pigment consists of a hydrous oxide of silicon in an amount of from 60 to 90 molar per cent and a hydrous oxide of aluminium in an amount of 40 to 10 molar per cent based on the total weight in moles of the coating and in which the weight of hydrous oxide of silicon is from 9 to 15 per cent by weight of $TiO_2$. If desired one or more organic coating agents can be present on the pigment such as alkanolamines, polyols or polyamines, e.g. triethanolamine. Pelletised titanium dioxide which may be obtained using the apparatus of the present invention is described and claimed in our British Pat. application No. 09036/71.

Preferably the titanium dioxide to be pelletised is introduced at a point located at least one-sixth along the length of the cylindrical drum or vessel or three feet along which ever is the least. It is also preferred to pass all the titanium dioxide to be pelletised through a sieve prior to pelletisation. The sieve used should have a mesh number of not less than 5 and less than 44 according to British Standard Specification No. 410,(1943). Preferably the mesh number is 7 to 10. A sieve having a mesh number of 5 has apertures having a size of 3.36 mm by 3.36 mm and a sieve having a mesh number of 44 has apertures having a size of 0.35 mm by 0.35 mm. The purpose of sieving is not to remove undersized or oversized particles but to improve the ease of pelletisation and it is believed this is effected by generating nuclei. Preferably the pigment before pelletisation has a bulk density of at least 0.34 grammes per millilitre prior to passage through the sieve. It is particularly desired that the pigment has a bulk density of 0.4 to 0.5 grammes per millilitre.

A process for the pelletisation of pigments is described and claimed in our British Pat. application No. 09035/71, 57618/71.

The rate of feed of the pigment to be pelletised, the size of the cylindrical drum or vessel and the speed of rotation of the drum all affect the rate of pelletisation of the pigment. The desired final size of pellets also influences the time of pelletisation and these can be varied to suit any particular manufacturing operation.

Usually the vessel or the drum is rotated so that its peripheral speed is from 3 to 38 metres per minute. A convenient speed for a particular product is from 10 to 30 metres per minute. The actual speed of rotation to produce such peripheral speeds depends on the size (diameter) of the vessel or drum.

The pellets produced using the apparatus of the present invention are particularly suitable for use in the manufacture of aqueous emulsion paint although they can also be used in other types of paint. The pelletised pigments can be dispersed easily in a paint base and the product is substantially grit-free.

They can be used for other purposes, for example in the manufacture of plastic and rubber compositions and in the manufacture of paper coatings.

The pellets produced are free-flowing, usually dust-free and are ideally suited for use in bulk handling procedures and for automatic feeding to mixing and other vessels. Usually the pellets will have a size of 5 mesh to 72 mesh according to British Standard Specification No. 410,(1943).

One form of the apparatus of the present invention will now be described by way of example only and with reference to the accompanying drawing, which is a diagrammatic representation of the apparatus.

Figure 1:
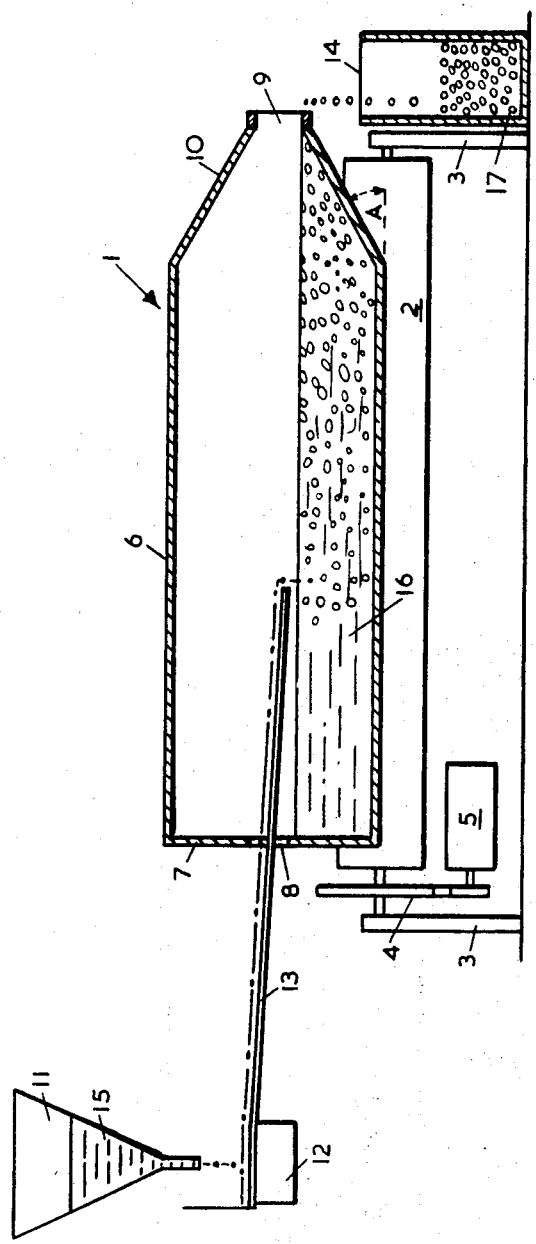
FIG. 1 is a horizontal cross-sectional view of a cylindrical form of the pelletising apparatus of this invention.

The pelletisation apparatus consists of a cylindrical drum 1 mounted on a pair of rollers 2, only one of which is shown. The rollers 2 are carried on a support framework 3 and are connected via gears 4 to an electric motor 5 for effecting rotation.

The cylindrical drum 1 is mounted with its longitudinal axis horizontal and has a cylindrical wall 6 of substantially uniform internal diameter and is provided at one end with an end-plate 7, having a centrally positioned inlet aperture 8. The other end of the cylindrical drum 1 is provided with an outlet aperture 9 with a wall 10 having a planar inner surface of uniformly decreasing diameter from the cylindrical wall 6 of the cylindrical drum 1. The wall 10 forms an angle with the axis of the drum 1 which is less than the angle of slip of the material pelletised.

Angle A shown between the wall 10 and a projection of the cylindrical wall 6 is less than the angle of slip and in this particular construction in which the cylindrical drum 1 is formed of stainless steel, the angle A is 10°.

The supply hopper 11 is mounted to feed the pigment to be pelletised on to a vibratory feeder 12 and along a feed plate 13 through the inlet aperture 8 into the interior of the cylindrical drum 1.

A container 14 is mounted beneath the outlet 9 into which the pelletised pigment is discharged.

In use a sample of titanium dioxide which has been passed through a sieve of mesh number 10 according to British Standard Specification No. 410,(1943) is stored in the hopper 11 as shown at 15. The pigment is fed on to the vibratory feeder 12 and along the feed plate 13 into the interior of the cylindrical drum 1 to form a bed of pigment 16. As the drum 1 is rotated pelletisation of the pigment 16 occurs and pigment is passed due to rotation of the drum and the continuous feed from the inlet end to the outlet end. Pellets of the pigment 16 pass along the wall 10 and through the outlet 9 to be collected in the container 14, as shown at 17.

It has been found that when the apparatus as shown in the drawing having an internal diameter of 30.5 cm and a length of 91 cm is used in pelletisation of titanium dioxide pigment the pellets produced are substantially free of grit and free of unpelletised titanium dioxide, with a constant feed rate of 400 grams of titanium dioxide per minute to the cylindrical drum 1 and a production rate of 400 grams of pelletised pigment per minute.

The unpelletised titanium dioxide fed to the drum 1 had an average crystal size of $0.26\mu$ and the drum was rotated at 30 r.p.m.

If desired the drum can be mounted on a beam pivoted at the inlet end so that the drum can be tilted to ease complete emptying of the drum and also to permit the drum to be at an angle other than the horizontal.

Figure 2:
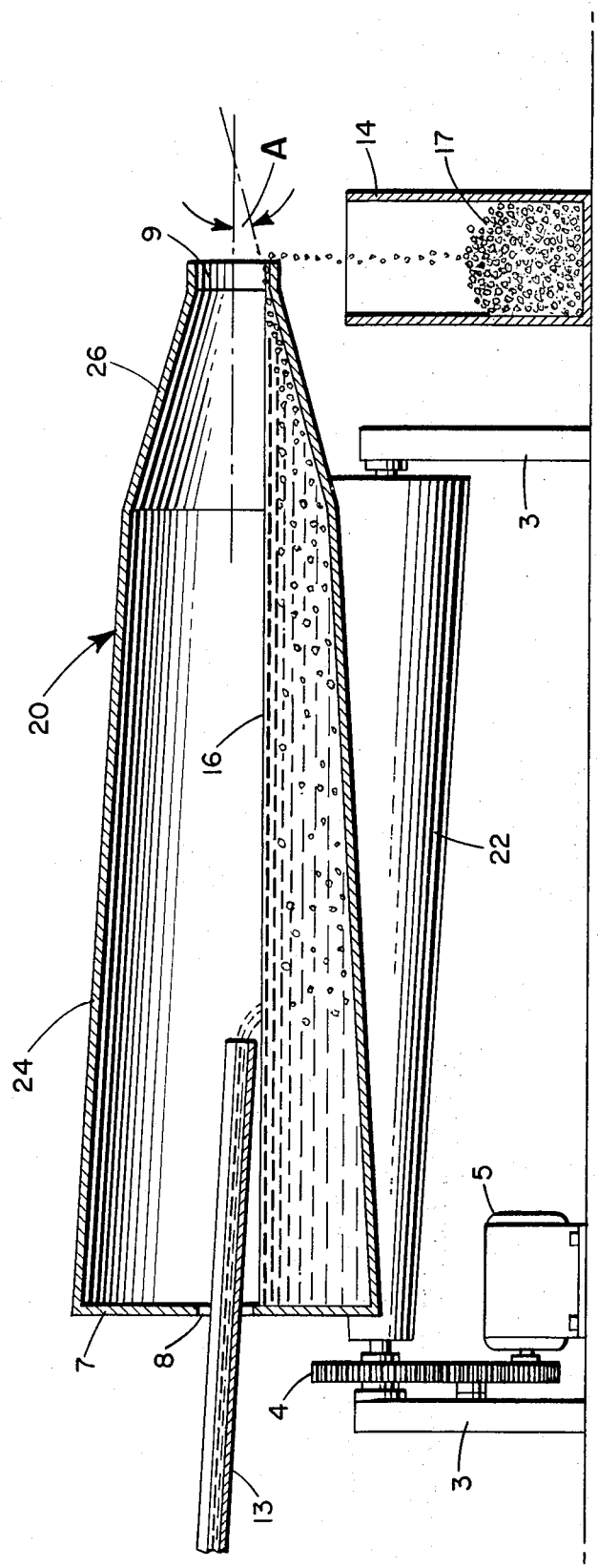
FIG. 2 is a horizontal cross-sectional view of a second form of the pelletising apparatus of this invention.

As mentioned previously, the vessel 24 can be constructed having walls 20 inclined to the horizontal so that the vessel is of progressively decreasing inner diameter from the inlet end to the outlet end. In this event, that part of the wall 26 adjacent the outlet 9 should be at an angle A with the axis of the vessel which is less than the angle of slip of pellets of the pigment on the material of construction of wall 26. The vessel may be mounted on a pair of rollers 22 only one of which is shown in FIG. 2.

What is claimed is:

1. Apparatus for the pelletisation of inorganic pigment comprising a cylindrical vessel mounted to be rotatable about its longitudinal axis which is substantially horizontal, and having in transverse cross section a circular inner surface, said vessel having an axial inlet for the inorganic pigment to be pelletised, a first portion, and an outlet portion of progressively uniformly decreasing internal diameter from said first portion to said axial outlet for pellets, the inner wall of said outlet portion being inclined to the longitudinal axis of the vessel at an angle which is less than the angle of slip of pellets of said inorganic pigment on the material of construction of the inner surface of said outlet portion.

2. Apparatus according to claim 1 in which the vessel is mounted on at least one pair of rollers mounted parallel to the longitudinal axis of the vessel and which are provided with suitable driving means to impart a rotating motion to the vessel.

3. Apparatus according to claim 1 in which the vessel is provided with bearings and a sprocket and means for driving the sprocket.

4. Apparatus according to claim 1 in which the vessel has a progressively decreasing internal diameter from the inlet end to the outlet end.

5. Apparatus according to claim 1 in which the cylindrical drum has a smooth interior wall of substantially uniform diameter along its cylindrical length with an inlet at one end and an outlet portion at the other end having a planar inner surface making an angle with the longitudinal axis of the drum which is less than the angle of slip of the formed pellets on the material of construction of the planar inner surface.

6. Apparatus according to claim 1 in which the outlet is an appropriately sized hole.

7. Apparatus according to claim 6 in which the outlet is provided with an outwardly directed flange or lip to assist discharge of the formed pellets into a suitable container.

8. Apparatus according to claim 1 in which a hopper is mounted below the outlet to collect formed pellets upon discharge from the vessel.

9. Apparatus according to claim 1 in which the vessel is formed from stainless steel.

10. The apparatus of claim 1 in which the pigment is titanium dioxide.

11. The apparatus of claim 1 in which the vessel is formed of stainless steel and the angle of the outlet portion to the axis of the vessel is less than 12°.

12. The apparatus of claim 10 in which the angle is not less than 5°.

13. Apparatus for the pelletisation of inorganic pigment comprising a cylindrical vessel mounted to be rotatable about its longitudinal axis which is substantially horizontal, said vessel being free of any internal baffles and having in transverse cross section a circular inner surface and having a first portion of constant internal diameter along its length with an axial inlet for the pigment to be pelletised and an outlet portion of progressively uniformly decreasing internal diameter from the first portion to an axial outlet for pellets so that the inner wall of said outlet portion is inclined to the longitudinal axis of the vessel at an angle which is less than the angle of slip of pellets of inorganic pigment on the material of construction of the inner surface of said outlet portion.

14. The apparatus of claim 13 wherein said inorganic pigment is titanium dioxide.

15. The apparatus of claim 13 in which the vessel is formed of stainless steel and the angle of said outlet portion to the axis of the vessel is less than 12°.

16. The apparatus of claim 13 in which said angle is not less than 5°.

* * * * *